US008857915B2

(12) United States Patent
Nieto et al.

(10) Patent No.: US 8,857,915 B2
(45) Date of Patent: Oct. 14, 2014

(54) SCANNING SYSTEM FOR 3D MINERALOGY MODELLING

(75) Inventors: Juan Nieto, Darling Point (AU); Hugh Durrant-Whyte, Rozelle (AU); Allan Blair, Cottesloe (AU)

(73) Assignee: The University of Sydney, The University of Sydney, New South Wales (AU)

( * ) Notice: Subject to any disclaimer, the term of this patent is extended or adjusted under 35 U.S.C. 154(b) by 705 days.

(21) Appl. No.: 12/398,169

(22) Filed: Mar. 4, 2009

(65) Prior Publication Data
US 2009/0256412 A1 Oct. 15, 2009

(30) Foreign Application Priority Data

Mar. 4, 2008 (AU) ................................ 2008901043
Sep. 19, 2008 (AU) ................................ 2008904896

(51) Int. Cl.
E21C 37/00 (2006.01)
F42D 3/04 (2006.01)
E21C 41/26 (2006.01)
H04N 1/00 (2006.01)
E21C 39/00 (2006.01)

(52) U.S. Cl.
CPC . *E21C 39/00* (2013.01); *F42D 3/04* (2013.01); *E21C 41/26* (2013.01); *H04N 1/00827* (2013.01)
USPC .................... 299/1.9; 299/18; 702/5; 711/100

(58) Field of Classification Search
USPC ........... 299/18, 1.9; 382/109; 711/100; 702/5
See application file for complete search history.

(56) References Cited

U.S. PATENT DOCUMENTS

| 3,658,260 | A | * | 4/1972 | Williams ........................ 241/19 |
|-----------|---|---|--------|-----------------------------------------|
| 3,975,053 | A |   | 8/1976 | Kochanowsky |
| 5,005,147 | A |   | 4/1991 | Krishen et al. |
| 5,925,081 | A |   | 7/1999 | Hawkins et al. |
| 6,052,520 | A |   | 4/2000 | Watts, III |
| 6,236,894 | B1 |  | 5/2001 | Stoisits et al. |
| 6,507,366 | B1 |  | 1/2003 | Lee |
| 2002/0112381 | A1 | | 8/2002 | Mizutani |

(Continued)

FOREIGN PATENT DOCUMENTS

| CL | 754-91 | 8/1991 |
|----|--------|--------|
| CL | 259-99 | 8/1999 |

(Continued)

OTHER PUBLICATIONS

Mincom—Stratmodel, 2006, retrieved from the internet: http://web.archive.org/web/2007029406094/http://www.mincom.com/solutions/minescape/stratmodel.aspx (Sep. 5, 2008).

(Continued)

*Primary Examiner* — Sunil Singh
(74) *Attorney, Agent, or Firm* — Blakely, Sokoloff, Taylor & Zafman LLP

(57) ABSTRACT

A method of mining comprising: using a vehicle fitted with scanning module to scan a bench face of a mine bench for both geometric and geological information; making ore grade assessments of material at the bench face from the information provided by the bench face scan; removing material from the bench; and transporting removed material for processing. At least one of said removing, transporting, and processing is performed at least partially dependent on the ore grade assessments.

27 Claims, 3 Drawing Sheets

(56) References Cited

U.S. PATENT DOCUMENTS

2005/0283294 A1    12/2005    Lehman, Jr. et al.
2006/0221072 A1    10/2006    Se et al.
2010/0098328 A1*    4/2010    Se et al. ........................ 382/154

FOREIGN PATENT DOCUMENTS

CN         1232197        10/1999
DE         276 158 A1     2/1990
DE         276158 A   *   2/1990

OTHER PUBLICATIONS

Mincom—Mincom MineScape, 2006, retrieved from the internet: http://web.archive.org/web/20070127195315/http://www.mincom.com/solutions/minescape/default.aspx (Sep. 5, 2008).

Australian Patent Office International-Type Search Report for Counterpart Application No. 2008901043, 2 pgs. (Sep. 9, 2008).

Chilean Patent Application No. 511-09, Informe Pericial Sobre Solicitud de Patente de Invención, Dated Apr. 3, 2009, 5 pages.

Chilean Patent Application No. 511-09, Respuesta Del Perito Sobre Solicitud de Patente de Invención, Dated Apr. 3, 2009, 5 pages.

Chinese Patent Application No. 200910127315.1, Notification of the First Office Action, Issue Date Apr. 24, 2012, 5 pages.

Chinese Patent Application No. 200910127315.1, Text of the First Office Action, Issue Date Apr. 24, 2012, 3 pages.

Dell PowerEdge M1000e Modular Blade Enclosure Product Details, <http://www.dell.com/content/producs/productdetails.aspx/pedge_M1000e?c=us&cs=555$ . . . >, Printed May 18, 2009, 3 pages.

Dell PowerEdge M600 Blade Server Product Details, <http://www.dell.com/content/products/productdetails.aspx/pedge_m600?c=us$cs=555%l= . . . >, Printed May 18, 2009, 3 pages.

European Patent Application No. 09716795.1, Supplementary European Search Report, Dated Jun. 6, 2011, 5 pages.

Extreme Rugged EBX Single Board Computer, <http://www.ampro.com/Products/LittleBoard/LittleBoard_800/>, Printed May 18, 2009, 1 page.

U.S. Appl. No. 12/398,171, Notice of Allowance, Dated Jul. 16, 2012, 7 pages.

U.S. Appl. No. 12/398,171, Notice of Allowance, Dated Mar. 7, 2012, 8 pages.

U.S. Appl. No. 12/398,171, Office Action, Dated Jul. 7, 2011, 28 pages.

* cited by examiner

SCANNING SYSTEM FOR 3D MINERALOGY MODELLING

CROSS-REFERENCE TO RELATED PATENT APPLICATIONS

This application claims the right of priority under 35 U.S.C. §119 based on Australian Patent application no. 2008904896 filed on Sep. 19, 2008 and Australian Patent application no. 2008901043 filed on Mar. 4, 2008, which are incorporated by reference herein in their entirety.

FIELD OF THE INVENTION

This invention relates to scanning methods and systems. It has particular application to open pit mining in which material is removed successively from benches following drilling and blasting, however is not limited to that application.

BACKGROUND OF THE INVENTION

Conventional open pit mining progressively follows an ore body using drilling and blasting, followed by shovel loading and truck haulage out of a pit. It is known to mine iron ore in large blocks using a series of benches so that various mining activities can be carried out concurrently (other than at actual blast times).

A bench of ore, for example 40 m long×20 m deep×10 m high and containing 8,000 tonnes of ore, is first drilled to form a pattern of "blast" holes and the residue therefrom, known as "blast cones", is sampled and analysed, for example by chemical analysis, to determine whether on average the ore is (a) high grade, (b) low grade or (c) waste material. The cut-off between high and low grades is dependent on a range of factors and may vary from mine to mine and in various sections of a mine.

The bench of ore is blasted using explosives. The prime explosives used are ANFO (Ammonium nitrate/fuel oil) based and dispensed in specially designed bulk dispensing trucks which can regulate the explosive density prior to loading down the hole. The blasted material is picked up by electric rope shovels, diesel hydraulic excavators, or front-end haul loaders and placed into haul trucks and transported from the mine pit. The ore is processed outside the mine pit depending on the grade determination/assessment. For example, waste ore is used as mine fill, low grade ore is stockpiled or used to blend with high grade ore, and high grade ore is processed further as required to form a marketable product.

In conventional pit mining as described above, the ore grade assessments are made on the basis of material at spot locations only and the outcome of analysis of material can take many days which can delay the planning of blasting recovery and transport of the ore material.

Any reference herein to prior art is not to be taken as an admission as to the common general knowledge of a person skilled in the art.

SUMMARY OF THE INVENTION

In one aspect the present invention provides a method of mining comprising: using a vehicle fitted with scanning module to scan a bench face of a mine bench for both geometric and geological information; making ore grade assessments of material at the bench face from the information provided by the bench face scan; removing material from the bench; and transporting removed material for processing, wherein at least one of said removing, transporting, and processing is performed at least partially dependent on the ore grade assessments.

The scanning module may comprise a hyperspectral imager to generate hyperspectral images of the bench face, the hyperspectral images containing geological information on the material at the bench face.

The hyperspectral imager may comprise an imaging spectrometer and/or a hyperspectral camera.

The scanning module may further comprise a geometry scanner for generating geometric information on the bench face the method further comprising: fusing the geometric information generated by the laser scanner with the geological information generated by the hyperspectral imager to produce a model of the geometric and geological information on the bench face.

The geometry scanner may be a laser.

The vehicle may move between spaced locations along the bench at which locations the vehicle stops for scanning of the surrounding terrain by the scanning module.

The scanning module may scan the surrounding terrain as the vehicle moves along the bench face.

The method may further comprise: drilling blast holes in the bench and blasting the bench using explosive placed in the blast holes; analysing drilling cuttings generated by the drilling of the blast holes; and wherein the outcome of the drilling cuttings analysis is used as a factor in the making of the ore grade assessments.

Analysis of the drill cuttings may be performed by the scanning module.

The step of scanning the bench face by the scanning module may be carried out prior to drilling the blast holes. Alternatively, the step of scanning the bench face is carried out after drilling the blast holes.

The method may further comprise the step of using the scanning module to make a further scan of the bench face after the bench has been blasted.

The outcome of the further scan may be used to assess movement of material in the bench during the blasting.

The outcome of the further scan may be used as a factor in the making of the ore grade assessments.

The method may further comprise the step of using the scanning vehicle to make an additional scan of the bench face after partial removal of the blasted material from the bench.

The outcome of the additional scan may be used as a factor in the making of the ore grade assessment.

The scanning module may incorporate a receiver to receive GPS position signals for use in the generation of the geometric information.

The method may further comprise the step of normalising data generated by the hyperspectral imager.

The method may further comprise placing one or more spectral imaging calibration members at spaced locations on the bench face, and wherein the step of normalising data generated by the hyperspectral imager comprises for scanning the or each spectral imaging calibration members obtain radiance data relating to the radiance of incident light and using the radiance data to normalise data generated by the hyperspectral imager.

Said members may comprise calibration boards having reflective surfaces of known spectrum.

Data from the scanning module may be transmitted from the vehicle to a processing station.

The scanning module data may be processed at the processing station to form a geological map.

The scanning module data may be used as an input to a model of the mine geology.

The geometry scanner may comprise a camera. The camera may be a RGB camera. The geometry scanner may further comprise a range scanner. The range scanner may be a laser.

In a second aspect the present invention provides a system for exploiting a mine, comprising: a data processing station; and a vehicle capable of movement along a mine bench face and fitted with a scanning module, the scanning module operable to scan the bench face and generate both geometric and geological information relating to the bench; and a transmitter for transmitting said geometric and geological information to the processing station.

The processing station may be provided with a processor for fusing the geometric and geological information data from the scanning module into a geological map.

The processor may be effective to form or update a geological model.

The scanning module may include one or more hyperspectral imagers for producing hyperspectral geological information relating to the bench.

The scanning module may further comprise a laser scanner for capturing geometric information.

In a third aspect the present invention provides a data processing station comprising: a receiving module operable to receive geological and geographical data associated with a region of interest; a processing module operable to process the geological and geographical data to make an ore grade assessment of a mineral deposit present within the region.

The data processing station may further comprise an instructing module operable to issue an excavation instruction dependent, at least in part, on the ore grade assessment.

In a further aspect the present invention provides computer program code comprising at least one instruction which when executed by a computer system causes the system to implement the method described in the above statements.

In a further aspect the present invention provides a computer readable medium providing the computer program code.

In a further aspect the present invention provides a method of mining comprising: receiving geological and geographical data associated with a region of interest; and processing the geological and geographical data to make an ore grade assessment of a mineral deposit present within the area of interest.

The method of mining may further comprise the step of issuing an excavation instruction dependent, at least in part, on the ore grade assessment.

The region of interest may be a bench face of a mine bench.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF THE EMBODIMENTS

Reflectance and emittance spectroscopy techniques can be used to obtain information regarding the chemical composition of an object or material. An advantage of spectroscopy is that it can be used at close or far range. A disadvantage of spectroscopy is that it is sensitive to small changes in the chemistry and/or structure of the object.

One object that may be analysed by using spectroscopy is an ore body. While the variations in material composition often cause shifts in the position and shape of spectral features and the spectral features to be examined in an ore body can be quite complex, spectroscopy still has great potential to estimate and classify key geological properties such as rock type and/or grade.

Hyperspectral images are produced by imaging spectrometers or hyperspectral cameras. Hyperspectral sensors collect data in hundreds of bands. These measurements produce a "continuum" spectrum that, after adjustments and corrections, can be compared with libraries of reflectance spectra. Typically, hyperspectral cameras collect all spectra across a spatial line in the image and scanning is required in order to build up a spectral image. By using an imaging spectrometer or hyperspectral camera in conjunction with a geometry scanner (such as a laser scanner used for Light Detection and ranging (Lidar) scanning) it is possible to build a geological map and model of a scanned terrain such as the face of a mine bench.

By fusing the geometric (e.g. Lidar scanning) data with the hyperspectral data, a three dimensional geological model of the environment can be generated. The term "fusing" refers to combining information from multiple sources to either create a new data model, or combining new information with already existing information of a data model to update a data model. The multiple sources can be either homogeneous or heterogeneous sources. The information from the multiple sources would typically have different characteristics but provides information about the same measured parameter. For example, in the present application chemical composition information (from the hyperspectral data) regarding a region of interest is fused with geometric information (e.g. from the Lidar scanning) of the same region to create a three-dimensional model of that region. The fusion of information may require the use of fusion algorithms.

As will be described in more detail below, such a model made of a mine excavation (or part thereof) may advantageously be used for spatial control and classification of mineral deposits within the mining excavation.

Figure 1:
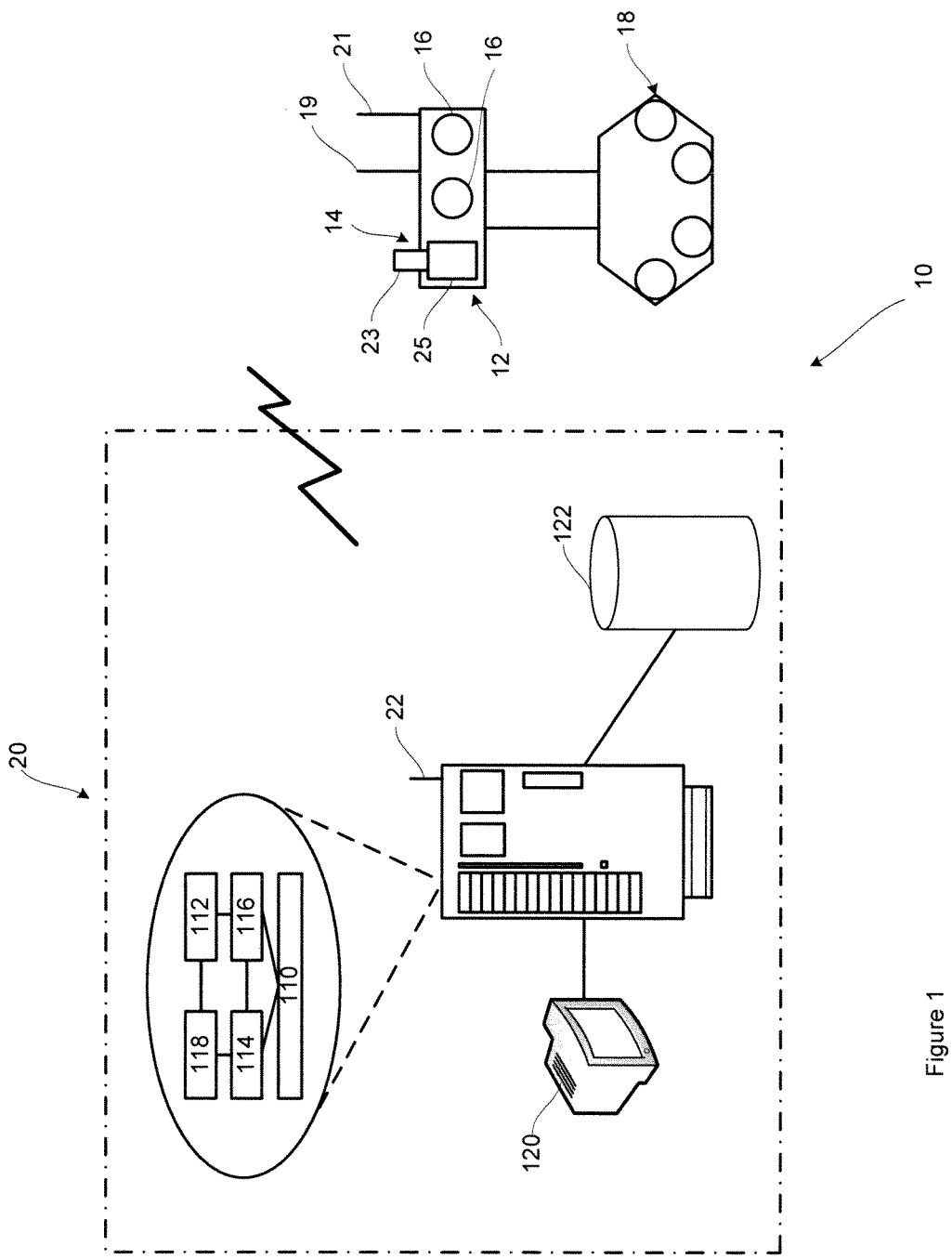
FIG. 1 is a schematic of a system in accordance with an embodiment of the present invention.

With reference to FIG. 1, there is shown a system 10 in accordance with an embodiment of the present invention that relates to mining.

The system 10 comprises a scanning module 12 which, in this case, includes two hyperspectral cameras 16 arranged to take measurements relating to the chemical characteristics of an area of interest (in the presently described embodiment, a "bench face" of a mine bench).

The scanning module 12 also includes a geometry scanner 14 for taking measurements relating to geometrical characteristics of the region of interest. The geometry scanner 14 may include a RGB camera 23 and a range scanner 25. For example, and as noted below, one possible geometry scanner 14 is the Riegl LMS-Z420i laser scanner which is provided with a range scanner (in the form of a laser) and co-mounted RGB camera. The geometry scanner 14 in this instance is used for Lidar scanning.

Alternative geometry scanners and scanning techniques are possible, such as radars and sonars (depending, of course, on the characteristics of the area of interest). Alternatively, passive sensors/sensing techniques may be used, e.g. a camera for measuring the light reflected by an object in the region of interest in order to get a spatial representation of an object spectrum. While a camera only gives a 2D representation, three-dimensional information may be obtained by taking several pictures from different vantage points and using triangulation methods (i.e. stereopsis). To enable absolute positional information to be provided as part of the geometric information the vehicle 18 is also provided with a receiver (not shown) for receiving GPS signals.

The scanning module 12 is coupled to a mobile vehicle 18 which may be a self-propelled vehicle or may be a trailer or similar to be towed behind a prime mover. The vehicle or prime mover may be directly contolled by a driver, under remote robotic control, or may be an autonomous (i.e. artificially intelligent) unit. The vehicle 18 carries a transmitter 19 for transmitting measurement data from the hyperspectral cameras 16 and geometry scanner 14 to a processing station 20. In an embodiment the measurement data is transmitted using standard radio frequency protocol.

The processing station 20 is in the form of a remotely located computing system coupled to a receiver 22. As previously described, the computing system 20 is operable to process the measurement data gathered by both the hyperspectral cameras 14 and geometry scanner 16 so as to produce geological survey data and generate a three dimensional terrain model providing high spatial and spectral coverage of the bench face. The geological survey data and terrain map can subsequently be utilised by the system 20 to make ore grade assessments of material throughout the bench face and, in accordance with those assessments (either solely or in combination with further input) to classify the material for extraction and further treatment according to grade.

An initial assessment may be obtained from a first scan of the bench face taken either before or after drilling but before blasting. The initial assessment may then be refined to allow for generation of a final classification of ore grades in the bench by combining the initial assessment with data taken from one or more subsequent scans of the bench face, and/or with data obtained by inspection of drill cuttings. The final determination/assessment and classification of ore grades can then be used to determine treatment of the mined material.

Comparing an initial pre-blasting model (constructed by use of a pre-blasting scan/assessment) with a post-blasting model (constructed by use of a post-blasting scan/assessment) can also be used to assess movement of material in the bench during the blasting.

The computing system 20 may also store a model of ore resources in the mine and use the hyperspectral and/or Lidar data to update the model.

Figure 2:
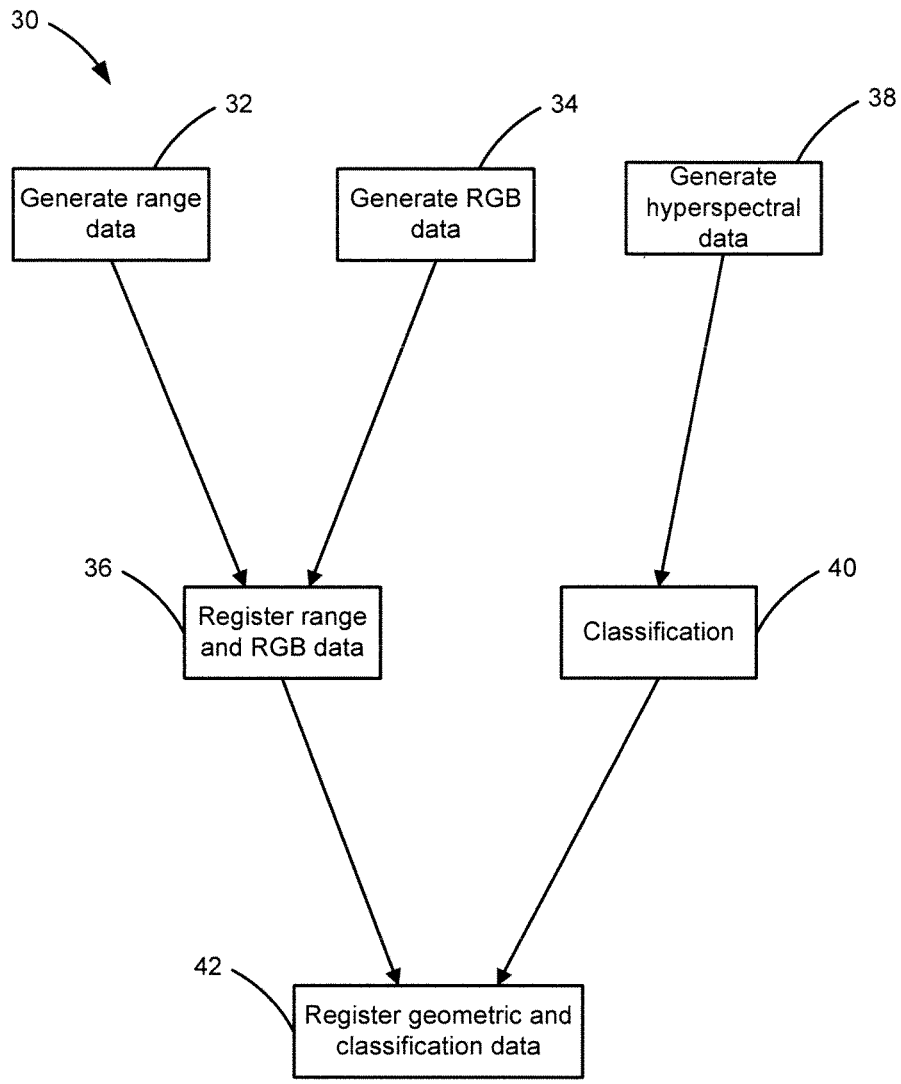
FIG. 2 is a block diagram showing method steps for generating a three dimensional geological map utilising the FIG. 1 system.

FIG. 2 provides a block diagram of the processes 30 involved in using data from the scanning module 12 to provide a three dimensional geological map/model.

In process 32 data from the range scanner 25 is used by the processing station 20 to generate range data (or a range image) in respect of the bench.

In process 34 data from the RGB camera 23 is used by the processing station 20 to generate a RGB data (or an RGB image) of the bench. Generation of the RGB data may require actual processing per se, or usable RGB data may be provided directly to the processing station 20 by the RGB camera 23.

In process 36 the processing station 20 generates a geometric representation of the bench by registering (fusing) the range data of process 32 with the RGB data of process 34. This registration may be achieved in a number of ways. For example, if the Riegl LMS-Z420i scanner is used, the scanner is arranged and calibrated such that the RGB camera 23 (providing RGB data) and the laser scanner 14 (providing range data) have aligned co-ordinate axes which can be used in registering the range data with the RGB picture. Software is provided with the Riegl LMS-Z420i scanner that can be used for this registration.

In process 38 data from the hyperspectral cameras 16 is used by the processing station 20 to generate hyperspectral data (or a hyperspectral image) relating to the bench.

In process 40 thematic mapping is used to analyse the hyperspectral data generated in process 38 and classify substances in the bench. As is known in the art, thematic mapping involves looking at the absorption bands shown in the hyperspectral image and mapping regions (or, if desired, individual pixels) of the data to substances by matching absorption bands of known substances (e.g. iron or haematite) with those substances.

In process 42 the processing station 20 generates the three-dimensional geological map by registering (or fusing) the classification data of process 40 with the geometric data of process 36 (i.e. the already registered geometric and RGB data). Registration here may, for example, be achieved by applying standard image processing techniques (such as edge detection) to the RGB data and the classification data. Alternatively, and as noted below, calibration boards may be used to register the classification data with the geometric data.

It will be appreciated that the processes described above may be performed serially or in parallel (except, of course, where one process requires input from a preceding process). For example, processes 38 to 40 may run in parallel with processes 32 to 36.

To achieve the above functionality, the processing station 20 may employ standard computer hardware such as a motherboard 110, a central processing unit 112, a random access memory 114, a hard disk 116, and networking hardware 118. In addition to the hardware, the system 20 includes an operating system (such as the Microsoft Windows™ XP Operating System, which is made by Microsoft Corporation) that resides on the hard disk and which co-operates with the hardware to provide an environment in which the software applications can be executed. In this regard, the hard risk 116 of the server 14 is loaded with a processing module which operates to generate the geological survey data and terrain model, as previously described and make associated ore grade assessments.

An instructing module may also be provided for issuing an excavation instruction dependent, at least in part, on ore grade assessments output from the processing module. A visual display unit 120 is also provided for graphically displaying the terrain map to a user. The computing system 20 is coupled to a database 122 for storing the aforementioned measurement data, geological survey data, terrain map data and model data.

In more detail, a scanning module 12 may utilise commercially available hyperspectral cameras and laser scanners. For example, for examination of iron ore bodies it has been found that Neo HySpex VNIR and SWIR cameras having the following characteristics are suitable.

| Sensor | VNIR 1600 | SWIR 320 m |
|---|---|---|
| Spectral range | 0.4-1 µm | 1.3-2.5 µm |
| Spatial pixels | 1600 × 1200 | 320 × 256 |
| # bands | 160 | 256 |
| Digitisation | 12 bit | 14 bit |

The VNIR camera may be used to detect iron ore whereas clay minerals can be detected by SWIR images. Different cameras may be used either alone or in combination depending on the nature of the data desired.

An appropriate geometry scanner (if Lidar techniques are to be used) is a 3D laser scanner such as the Riegl LMS-Z420i scanner which is provided with both a laser and RGB camera and has the following characteristics.

| Sensor | LMS Z420i |
|---|---|
| Measurement range | 1000 m |
| Minimum range | 2 m |
| Accuracy | 10 mm |
| Laser wavelength | Near infrared |
| Scanning vertical range | 0-80 deg. |
| Scanning horizontal range | 0-360 deg. |
| Angular resolution | 0.002 deg. |

The hyperspectral cameras and geometry scanner have inbuilt scanning movements allowing them to be mounted to the movable vehicle 18 for operation to scan surrounding landscape. The cameras and scanner may be configured to continuously scan the surrounding landscape while the vehicle is moving, or may take periodic measurements from selected locations (either during movement of the vehicle or while the vehicle is stationary).

A raw hyperspectral image consists of a set of digital numbers (DNs) without physical units. Using the camera parameters, these digital values are converted to at-sensor radiance [$W.nm^{-1}.sr^{-1}.m^{-2}$.]. Radiance is in part dependent on the spectrum intensity of the input solar energy and as such it is not useful for comparison with libraries or work with multi-temporal or multi-sensor data. To normalise the data, the pixel radiance is divided by the incident light radiance. This process gives reflectance.

There are different methods to calculate reflectance. A number of empirical techniques have been developed which do not make explicit use of atmospheric data and models. For this reason they are usually referred as normalisation techniques. One normalisation technique which can be employed is to use a calibration board having a known spectrum and from which is possible to calculate the radiance of the incident light to enable the image to be converted to reflectance. A series of calibration boards may be placed at spatial locations throughout/along the bench face for this purpose.

If used, calibration boards may also be used for registration of hyperspectral data with geometry data (as described in process 42 above).

The system 10 as described above may be used at an open pit mine as follows:

1. Obtaining information from the mine as excavated, prior to drill and blast.

This can establish a starting point for registration of mineralisation, comparison and update of a resource model. Coating of dust on rock surfaces may be an issue and so there may be a need to identify the differences between dry and wet scans following wash down using a watercart or rain.

2. Obtaining information post drilling by hyperspectral scanning of faces and drill cuttings (drill cones). This can highlight the mineralisation and coarse geometry of material lying within the bench.
3. Obtaining information post blasting to assess movement of mineralisation. Again, the effect of dust coating can, if necessary, be addressed by washing down of the area in order to obtain accurate estimates.
4. Obtaining information during excavation to provide a continuous assessment of exactly what is being mined. This will enable reconciliation and dynamic adjustment of excavation instructions, ie. what of the excavated material is ore and what is waste. This also enables a resource model to be updated dynamically using data fusion techniques.
5. Processing of the data to extrapolate the geometry, mineralisation continuity and grade beneath the bench and laterally to update the resource model.

It will be understood by persons skilled in the art that the vehicle and processing system may communicate using any suitable communication technique and is not limited to the actual communication technique described above. For example, communication may be made over any wireless or wired network including radio networks, infra-red networks, local area networks and the like.

Equally, the aforementioned processing system could be implemented by any appropriate computer software and hardware and is not limited to the particular architecture shown in the drawings and described embodiment. Any particular architecture could be used including client server arrangements, mainframes, stand-alone or networked computers, and the like. For example, the system could be entirely incorporated into a single stand-alone configuration whereby the personal computer includes all of the modules operable to implement the afore-mentioned embodiments. For example, the processing station could be provided "on-board" the vehicle such that all of the modules are integrated into a single unit.

Figure 3:
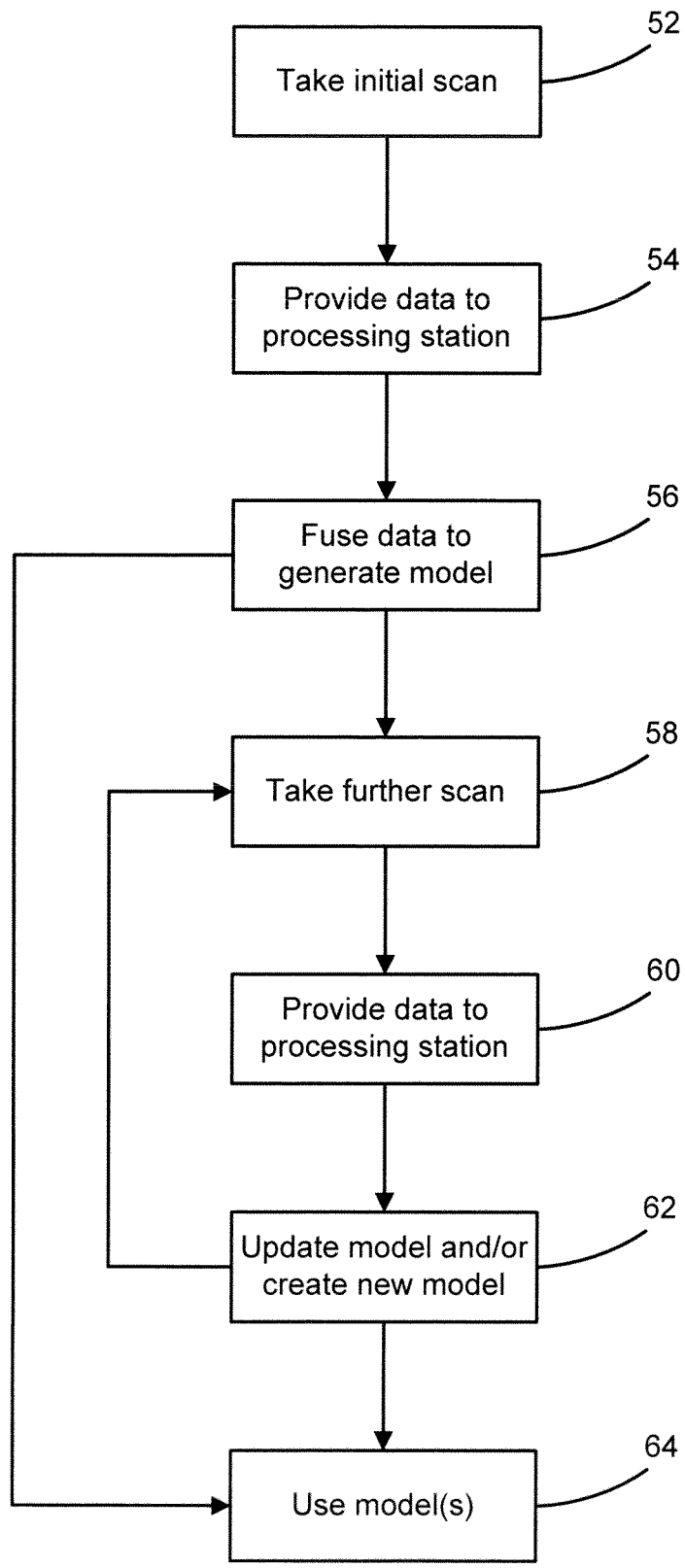
FIG. 3 is a flow chart showing method steps for developing a three dimensional model in accordance with a further embodiment of the invention.

While the invention has, for the purposes of illustration, been described above in relation to a mining application, it will be appreciated alternative applications of the invention are possible. In general terms, and referring to FIG. 3, the invention may be used to develop a three-dimensional model of a region of interest, the model including both geometric information and chemical composition information.

In step 52 the vehicle 18 with scanning module 12 traverses a region of interest to take an initial scan of that region with the hyperspectral cameras 16 (providing chemical composition information) and the geometric scanner 14 (providing geometric information). Depending on the terrain, the vehicle 18 may be adapted to traverse the region by flight, wheeled conveyance, or under/over water conveyance.

In step 54 data from the initial scan is provided to the processing station 20. As discussed above, the data may be sent to the processing station 20 via a wireless communication protocol. Alternatively, the processing station 20 may be carried by the vehicle 18 and data provided to it by a wired communication protocol.

In step 56 the processing station 20 fuses the chemical composition information and geometric information in order to produce a three dimensional model of the region of interest, the model providing information on both the geometry and chemical composition of the region of interest.

In step 58, and if desired/require, the vehicle 18 may again traverse all or part of the region of interest to take a further scan and obtain further geometric and chemical composition information.

In step 60 the data from the further scan is provided to the processing station 20, and in step 62 the data processing station 20 uses the data from the further scan to either update the model of step 56 and/or create a new model. Updating the model generated in step 56 may be appropriate where further accuracy is required. Creation of a further model of the region may be of use when a comparison between the region at the time of the initial scan and the region at the time of the further scan is desired.

Steps 58 to 62 may be repeated as is required or desired or, if only one scan is required, omitted entirely.

At step 64 the models generated in step 58 and/or step 62 are used. As will be appreciated, the actual use of the model(s) will depend on the application.

For example, in the mining embodiment described above the models may be used to determine the most appropriate drilling locations, to classify and process ore, and/or to determine movement within the mine after blasting.

The term "comprises" (and its grammatical variants) as used herein is equivalent to the term "includes" and should not be taken as excluding the existence of additional features, steps or integers.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of mining comprising:
    using a vehicle fitted with a scanning module to concurrently scan a bench face of a mine bench for both geometric and geological information;
    processing the geological information to determine a geological classification;
    fusing the geometric information and the geological classification to produce a model of the geometric and geological information including ore grade information of the bench face;
    removing material from the bench; and
    transporting removed material for processing, wherein
    at least one of said removing, transporting, and processing is performed at least partially dependent on assessment of the model in terms of the ore grade information.

2. The method as claimed in claim 1, wherein the scanning module comprises a hyperspectral imager to generate hyperspectral images of the bench face, the hyperspectral images containing geological information on the material at the bench face.

3. The method as claimed in claim 2, wherein the hyperspectral imager comprises an imaging spectrometer and/or a hyperspectral camera.

4. The method as claimed in claim 2, wherein the scanning module further comprises a geometry scanner for generating geometric information on the bench face the method further comprising:
    fusing the geometric information generated by the geometry scanner with the geological information generated by the hyperspectral imager thereby to produce the model of the geometric and geological information of the bench face.

5. The method as claimed in claim 4, wherein the geometry scanner comprises a laser.

6. The method as claimed in claim 4, wherein the geometry scanner comprises a camera.

7. The method as claimed in claim 2, further comprising the step of normalising data generated by the hyperspectral imager.

8. The method as claimed in claim 7, further comprising placing one or more spectral imaging calibration members at spaced locations on the bench face, and wherein the step of normalising data generated by the hyperspectral imager comprises:
    scanning the or each spectral imaging calibration member to obtain radiance data relating to a radiance of incident light; and
    using the radiance data to normalise data generated by the hyperspectral imager.

9. The method as claimed in claim 8, wherein said spectral imaging calibration members comprise calibration boards having reflective surfaces of a known spectrum.

10. The method as claimed in claim 1, wherein the vehicle moves between spaced locations along the bench at which locations the vehicle stops for scanning of the bench face by the scanning module.

11. The method as claimed in claim 1, wherein the scanning module scans the bench face as the vehicle moves along the bench face.

12. The method as claimed in claim 1, further comprising:
    drilling blast holes in the bench and blasting the bench using explosive placed in the blast holes;
    analysing drilling cuttings generated by the drilling of the blast holes; and wherein
    an outcome of the drilling cuttings analysis is used as a factor in producing the model of the geometric and geological information of the bench face.

13. The method as claimed in claim 12, wherein analysis of the drill cuttings is performed by the scanning module.

14. The method as claimed in claim 12, wherein the step of scanning the bench face by the scanning module is carried out prior to drilling the blast holes.

15. The method as claimed in claim 14, further comprising the step of using the scanning module to make a further scan of the bench face after the bench has been blasted.

16. The method as claimed in claim 15, wherein the outcome of the further scan is used to assess movement of material in the bench during the blasting.

17. The method as claimed in claim 15, wherein the outcome of the further scan is used as a factor in producing the model of the geometric and geological information of the bench face.

18. The method as claimed in claim 12, wherein the step of scanning the bench face is carried out after drilling the blast holes.

19. The method as claimed in claim 12, further comprising the step of using the scanning vehicle to make an additional scan of the bench face after partial removal of the blasted material from the bench.

20. The method as claimed in claim 19, wherein the outcome of the additional scan is used as a factor in producing the model of the geometric and geological information of the bench face.

21. The method as claimed in claim 1, wherein the scanning module incorporates a receiver to receive GPS position signals for use in the generation of the geometric information.

22. The method as claimed in claim 1, wherein data from the scanning module is transmitted from the vehicle to a processing station.

23. A system for exploiting a mine, comprising:
    a data processing station; and
    a vehicle capable of movement along a mine bench face and fitted with a scanning module, the scanning module operable to scan the bench face and concurrently generate both geometric and geological information relating to the bench face; and
    a transmitter for transmitting said geometric and geological information to the data processing station for:
        processing the geological information to determine a geological classification;
        fusing the geometric information and the geological classification to produce a model of the geometric and geological information including ore grade information of the bench face, and
        providing instructions that are at least partially dependent on assessment of the model in terms of the ore grade information for at least one of removing, transporting, and processing material from the bench face.

24. The system as claimed in claim 23, wherein the scanning module includes one or more hyperspectral imagers for producing hyperspectral geological information relating to the bench.

25. The system as claimed in claim 23, wherein the scanning module further comprises a laser scanner for capturing geometric information.

26. A data processing station comprising:
 a receiving module operable to receive geological and geographical data associated with a region of interest, the geological and geometric data having been scanned concurrently;
 a processing module operable to a) process the geological information to determine a geological classification, and to b) fuse the geometric information and the geological classification to produce a model of the geometric and geological information including ore grade information associated with a region of interest; and
 an instructing module operable to issue an excavation instruction dependent, at least in part, on assessment of the model in terms of the ore grade information.

27. A non-transitory computer readable medium providing computer program code which when executed by a computer system causes the system to implement a method, comprising:
 providing instructions to a vehicle fitted with a scanning module to concurrently scan a bench face of a mine bench for both geometric and geological information;
 receiving scanned geometric and geological information;
 processing the geological information to determine a geological classification;
 fusing the geometric information and the geological classification to produce a model of the geometric and geological information including ore grade information of the bench face; and
 providing instructions for:
  removing material from the bench, and
  transporting removed material for processing, wherein at least one of said removing, transporting, and processing is performed at least partially dependent on assessment of the model in terms of the ore grade information.

* * * * *